(12) United States Patent
Denoual

(10) Patent No.: US 8,219,901 B2
(45) Date of Patent: Jul. 10, 2012

(54) METHOD AND DEVICE FOR FILTERING ELEMENTS OF A STRUCTURED DOCUMENT ON THE BASIS OF AN EXPRESSION

(75) Inventor: Franck Denoual, Saint Domineuc (FR)

(73) Assignee: Canon Kabushiki Kaisha, Tokyo (JP)

( * ) Notice: Subject to any disclaimer, the term of this patent is extended or adjusted under 35 U.S.C. 154(b) by 625 days.

(21) Appl. No.: 11/943,832

(22) Filed: Nov. 21, 2007

(65) Prior Publication Data

US 2008/0140645 A1   Jun. 12, 2008

(30) Foreign Application Priority Data

Nov. 24, 2006 (FR) ...................................... 06 55105

(51) Int. Cl.
*G06F 17/00* (2006.01)
(52) U.S. Cl. ........ 715/234; 715/235; 715/236; 715/239; 707/769
(58) Field of Classification Search .................. None
See application file for complete search history.

(56) References Cited

U.S. PATENT DOCUMENTS

| | | | |
|---|---|---|---|
| 6,931,405 B2* | 8/2005 | El-Shimi et al. ..................... | 1/1 |
| 6,941,511 B1* | 9/2005 | Hind et al. ..................... | 715/235 |
| 7,346,858 B1* | 3/2008 | Berg et al. ..................... | 715/853 |
| 2004/0261019 A1 | 12/2004 | Imamura et al. ............... | 715/513 |
| 2005/0187906 A1 | 8/2005 | Madan et al. ..................... | 707/3 |
| 2007/0083807 A1* | 4/2007 | Shaudys et al. ............... | 715/513 |
| 2007/0162476 A1* | 7/2007 | McCollum ..................... | 707/101 |

OTHER PUBLICATIONS

Benedikt, M. et al., "XPath Satisfiability in the Presence of DTDs", ACM, Symposium on Principles of Database Systems, Baltimore, USA, Xp002444271, Jun. 2005.
Kamps, J., et al., "Best-Match Querying from Documents-Centric XML", Seventh International Workshop on the Web and Databases, Paris, France, XP002444272, Jun. 2004.
Berglund, A., et al., "XML Path Language (XPath) 2.0," URL:http://www.w3.org/TR/2003/WD-xpath20-20031112; Nov. 12, 2003.

* cited by examiner

*Primary Examiner* — Tim T Vo
*Assistant Examiner* — Sangwoo Ahn
(74) *Attorney, Agent, or Firm* — Fitzpatrick, Cella, Harper & Scinto

(57) ABSTRACT

Method, device and computer-readable medium are provided for filtering elements of a structured document on the basis of an expression including an item of information for identification of an evaluation mode of a part of the expression. A step of evaluating the expression on the basis of the data of the structured document is performed by evaluating the part of the expression on the basis of the item of information for identification of the evaluation mode, the evaluation mode corresponding to (i) an extraction of elements not satisfying the part of the expression, (ii) an extraction of elements satisfying the part of the expression, or (iii) an extraction of elements satisfying the part of the expression and an extraction of elements not satisfying the part of the expression.

22 Claims, 9 Drawing Sheets

Figure 1

```
<?xml version="1.0" encoding="UTF-8"?>
<bookshop>
<book price="17.99">
<title lang="English">Harry Potter and the Half Blood Prince</title>
<author>JK Rowling</author>
</book>
<book price="16.47">
<title lang="French">Les Misérables</title>
<author>V Hugo</author>
</book>
<book price="26.37">
<title lang="English">Learning XML</title>
<author>E T Ray</author>
</book>
<book price="13.57">
<title lang="German">Selected Poems</title>
<author>Goethe</author>
</book>
</bookshop>
```

Example of XML document — 0.1

```
//book[title/@lang="French"]
//book[@price<20]
//book[title/@lang="French"][@price<20]
```

Example of filtering requests — 0.2

Figure 9

| Mode | Predicate | Position | LocationPath of an expression... | Status: "resolved with..." |
|---|---|---|---|---|
| "match" | all true | intermediate | any | intermediate solution |
| | | last | principal sub-expression | final result<br>partial result |
| | at least 1 false | intermediate | any | without solution |
| | | last | principal sub-expression | without solution<br>without solution |
| "non-match" | all true | intermediate | any | without solution |
| | | last | principal sub-expression | without solution<br>without solution |
| | at least 1 false | intermediate | any | intermediate solution |
| | | last | principal sub-expression | final result<br>partial result |
| "match/ non-match" | all true | intermediate | any | intermediate solution |
| | | last | principal sub-expression | final result<br>partial result |
| | at least 1 false | intermediate | any | intermediate solution |
| | | last | principal sub-expression | final result<br>partial result |

METHOD AND DEVICE FOR FILTERING ELEMENTS OF A STRUCTURED DOCUMENT ON THE BASIS OF AN EXPRESSION

BACKGROUND OF THE INVENTION

1. Field of the Invention

The present invention relates to a method and device for filtering elements of a structured document on the basis of an expression, in particular an expression of XPath type.

2. Related Art

It has a general application in the processing of data streams in markup language and more particularly for files of XML format.

A document, according to the invention, comprises a plurality of elements structuring the data of the document, those elements being termed nodes in XML terminology.

The XPath language (acronym for "XML Path Language") comes from a specification of the W3C consortium called "XPath Specification 1.0" presented at the address www.w3.org/TR/xpath. The objective of this language is to define a syntax adapted to address parts of a structured document of XML type.

The syntax of this language uses a similar syntax to that used in the expressions relative to LocationPaths in a file system, for example the expression relative to a LocationPath "/bookshop/book".

The XPath language defines four types of data which are "string", "Boolean", "number" and "node-set", seven types of nodes also termed elements, and expressions making it possible to manipulate the data, in particular the defined operators "equal", "different", "less than", "greater than", "plus", "minus", "multiply", "divide", "modulo", "binary or" and "binary and". Nodes may represent different types of XML event, for example the start of the document (also termed the root node), an XML element, an attribute, a text, a comment, a processing-instruction, and a namespace. This syntax enables the expression of requests in relation to structured documents, for the purpose, for example, of transforming them (for example the XSLT transformation according to the W3C recommendation defined at the address www.w3.org/TR/xslt), of fast accessing sub-parts (for example according to the W3C recommendation: XPointer: www.w3.org/TR/WD-xptr) or of carrying out processing on parts of the document (for example according to the XQuery 1.0 language, defined at the address www.w3.org/TR/xquery).

The XPath language makes it possible to simplify the development of applications suitable for going through data in structured documents of XML type.

The entity adapted to perform the evaluation of an XPath expression is called an XPath Processor. On the basis of an XPath expression and a reference to XML data stored in a document or received via a network transmission, the XPath Processor evaluates the expression.

The XPath syntax also defines a grammar describing the rules of construction for the different expression and sub-expressions. These expression are in particular expressions returning a Boolean (for example the expressions OrExpr, AndExpr, RelativeExpr, EqualityExpr), the expressions returning a number (for example AdditiveExpr, MultiplicativeExpr), the expressions returning any type of data (for example the expressions FilterExpr and Function Call), and the expressions returning an ordered list of nodes (for example the LocationPath expressions corresponding to the specification of a path to resolve in an XML document).

BRIEF DESCRIPTION

The invention is particularly adapted to the expressions relative to a location path ("LocationPath" according to the XPath language syntax).

An expression relative to a LocationPath may be absolute or relative depending on whether it starts with "/" or not. In the case of an expression relative to an absolute path, the search starts from the beginning of the document, also termed root, whereas in the case of a expression relative to a relative path, the search is contextual, for example starting from the current node.

Any expression relative to a LocationPath is composed of a set of expressions indicating the "Steps" of location in that path, and each location step corresponding to a breakdown level for the evaluation of the expression relative to a LocationPath. More particularly, each location step may be matched with a level of depth in the XML document. For example the expression relative to the path /bookshop/book comprises two location steps which are "bookshop", searched for at depth 1, and "book", searched for at depth 2.

The evaluation of a location step is in particular carried out on the basis of the expression of the parent location step, i.e. the preceding location step in the expression. The result of the evaluation of a location step provides the evaluation context for the following location step. The context is composed of three elements: a node termed "context node", a position and a size. The context node is the node in the document which verifies the preceding location step, the position indicates the rank of the solution node of the current location step among its siblings, the size of the context indicates the number of solution nodes of the current location step.

Any location step comprises one to three entities of the following entities:

Firstly, the entity expressing a filiation, also termed axis ("AxisSpecifier" according to the XPath syntax) describes the relationship between a context node and the solution nodes of a location step. This entity is optional. By default, this entity takes the value "child" according to the XPath syntax. For example, the expressions "/a/child::b" and "/a/attribute::b" mean that a search is respectively made for a node "b" child of a node "a", the node "a" being at the root of the document and a node representing an attribute "b" child of a node "a", the node "a" also being at the root of the document. The specification defines 13 types of entity expressing a relationship of filiation ("AxisSpecifier") which are self, child, attribute (or @), namespace, descendant, descendant-or-self, following, following-sibling which are considered as expressions of descending filiation i.e. forward axes, and parent, ancestor, ancestor-or-self, preceding and preceding-sibling which are considered as expressions of ascending filiation i.e. backward or reverse axes.

Next, the entity expressing a test of eligibility of a candidate node ("NodeTest" according to XPath syntax) defines either a constraint of type or a constraint of name that the candidate nodes must comply with to be considered as solution to a location step. This entity is mandatory.

The syntax defines different tests of node type, in particular, the constraint of "node" type ("node( )" according to the XPath syntax), the constraint of "text" type ("text( )" according to XPath syntax), the constraint of "comment" type ("comment( )" according to the XPath syntax) and the constraint of "processing-instruction" type ("processing-instruction( )" according to the XPath syntax).

For example, the expression "/child::b" imposes a constraint of name whereas the expression "/descendant::comment( )" makes it possible to search for all the nodes of comment type.

Lastly, the entity expressing a "Predicate" according to the XPath syntax makes it possible to impose one or more additional conditions for the search for solution nodes for a location step. This entity is optional. An expression termed "predicate", indicated between square brackets, follows the same rules of construction as any XPath expression. For example the expression "/a/b[2]" makes it possible to select all the second child XML elements of name "b" of each node of XML element type of name "a", and the expression "/a/b [@id="3"] makes it possible to select the children of name "b" of the node of XML element type of name "a" having an attribute "id" having a value equal to 3.

The current implementation of the XPath language make it possible to access parts of an XML document after having constructed an intermediate representation of the XML document adapted to facilitate the search, in particular in the form of a tree representing a model of objects of the document ("Document Object Model" or DOM defined at the address www.w3.org/DOM). Thus, the search consists of going through that tree as many times as necessary for the extraction of the requested nodes. Such an approach poses a double problem.

This solution proves to be costly in memory space in particular in the case of XML documents of large size. This is, if an XPath processor is implanted in an apparatus of camera, photocopier or other type, having limited resources, the intermediate representation may be too voluminous to be stored in memory. Furthermore, this solution proves to be costly in execution time on account of the multiple passes through the DOM tree during the search for solution nodes of the XPath expression.

Furthermore, if it is desired to extract at the same time the XML nodes satisfying one (or more) constraint(s) and they do not satisfy it (or them), the syntax of the XPath 1.0 specification imposes the evaluation of several expressions.

The example illustrated in FIG. 1 comprises an example of an XML document (0.1) on which evaluation is made of one or more XPath expressions, such as those illustrated at (0.2). These expressions make it possible to extract from the XML document "book" elements with particular characteristics, represented by the XPath predicates, these predicates being expressions placed between square brackets.

For each of the expressions expressed at (0.2), if it is desired to have, on the one hand, "book" elements satisfying the predicate or predicates, and/or on the other hand, "book" elements not satisfying those predicates or only partially satisfying those predicates in the case of multiple predicates, it is required to write the corresponding XPath expression or expressions, to evaluate them and to combine the results.

Thus, for example, although the conventional XPath expression //book[@price>20] amounts to requesting the XPath processor for the nodes of "book" type having a "price" attribute of which the value is greater than 20, this expression does not however also formulate the following requests: "What are the nodes of type "book" having an attribute "price" of which the value is not greater than 20?" and "What are the nodes of "book" type having an attribute "price" of which the value is greater than 20 and what are those with an attribute "price" of which the value is not greater than 20?".

A method is known from the document U.S. Pat. No. 6,931,405 entitled <<Flexible subscription-based event notification>> for filtering XML documents based on mechanisms of subscription for reasons of "personalization" of the processing of XML information.

Thus each subscriber only receives the sub-part of an XML document of interest to him. For this, the preferences of the subscribers are translated into XPath requests. This method thus performs the filtering of XML data via the evaluation of a plurality of expressions in relation to the same document.

A method is described according to the document U.S. Pat. No. 6,941,511 entitled "High-performance extensible document transformation" directed to optimizing transformations of XML documents by applying an optimized transformation to the nodes which satisfy an XPath request and a conventional transformation to other nodes. However, this method requires a double evaluation to extract, in a first phase, all the nodes satisfying the request, and in a second phase, the list of the nodes not satisfying the request.

Thus, this document describes a method of filtering XML documents.

Given the above, it would consequently be desirable to be able to provide a means for specifying, in a single expression, the nodes to extract and to yield them at the time of a single evaluation with an associated status, for example satisfying or not satisfying, and overcoming at least some of the drawbacks mentioned above.

The present invention concerns firstly providing a method of filtering elements of a structured document on the basis of an expression, characterized in that, the expression comprising an item of information for identification of the evaluation mode of a part at least of said expression, the method comprises a step of evaluating said expression on the basis of the data of the document, the evaluating step comprising an evaluation of said part of the expression on the basis of the item of information for identification of the evaluation mode.

The method of filtering elements of a structured document on the basis of an expression, in particular an expression of XPath type, according to the invention, makes it possible to carry out an evaluation of the expression using an evaluation mode defined by an item of information for identification of the evaluation mode. Thus, according to the information for identification of the evaluation mode, the expression is evaluated differently.

According to the invention, a part of the expression is evaluated according to the evaluation mode identified.

Thus, writing of advanced expressions is enabled, comprising different modes of evaluation of different parts of the expression and to filter the data of the document according to the expression in a single pass, that is to say without going through the data of the document a plurality of times.

According to a particular feature, the expression comprising at least one sub-expression relative to a LocationPath, at least one sub-expression comprises said part of the expression.

According to this feature, the expression is composed of at least one sub-expression relative to a LocationPath and at least one sub-expression comprises the part of the expression to evaluate according to a particular evaluation mode.

According to another particular feature, each sub-expression relative to a LocationPath comprising at least one location step, at least one location step comprises said part of the expression.

According to one embodiment, each sub-expression is composed of at least one location step and at least one location step comprises the part of the expression to evaluate according to a particular evaluation mode.

Thus, according to this embodiment, it is possible to apply an evaluation mode to a step of locating a LocationPath of the expression being processed.

According to another embodiment, the step of evaluating said expression comprises a step of evaluating at least one location step.

According to a particular embodiment, the step of evaluating at least one location step furthermore depends on the position of said at least one location step in the sub-expression relative to the LocationPath.

According to another particular embodiment, the step of evaluating at least one location step furthermore depends on the nature of the sub-expression relative to the LocationPath.

According to a particular feature, at least one location step comprising at least one predicate, the step of evaluating said at least one location step furthermore depends on the result of the evaluation of said at least one predicate associated with said at least one location step.

According to this feature, the evaluation of a location step depends on the result of the evaluation of a predicate of the location step.

According to another particular feature, said at least one predicate comprises said part of the expression.

Thus, according to this feature, it is possible to associate an evaluation mode with a predicate of the expression being processed.

According to still another particular feature, said information for identification of the evaluation mode of said at least one predicate identifying a mode of extraction of the elements satisfying said at least one predicate and of the elements not satisfying said at least one predicate, the step of evaluating the location step extracts elements satisfying said at least one predicate and elements not satisfying said at least one predicate.

Thus, in a single pass through the whole of the document, it is possible to obtain a set of nodes satisfying the expression including said at least one predetermined predicate and a set of nodes satisfying the expression with the exception of said at least one predetermined predicate.

According to this feature, if a predicate is evaluated so as to identify the elements satisfying and not satisfying the part of the expression, then the location step is evaluated with that same evaluation mode.

According to a particular feature, said information for identification of the evaluation mode identifies an extraction mode of the elements not satisfying said part of the expression.

Thus, the invention makes it possible to avoid the re-writing of one or more expressions for the purpose of extracting such elements, which process may prove to be relatively complex.

According to another particular feature, said information for identification of the evaluation mode identifies an extraction mode of the elements satisfying said part of the expression and of the elements not satisfying said part of the expression.

The invention makes it possible to filter the elements satisfying and not satisfying a part of the expression without complex re-writing and without necessitating several processing operations on the document to filter.

According to one embodiment, the method comprises a step of associating an item of information with the extracted elements, indicating the satisfaction or non-satisfaction of the elements extracted from said part of the expression.

According to this embodiment, the evaluation mode of the filtered elements is associated with those filtered elements, thus with the extracted elements. The application for which these elements is destined is thus informed of the fact that an element received satisfies the expression or not, which facilitates the processing of such an element.

According to a particular feature, a pertinence measurement is furthermore associated with the extracted elements.

Thus, it is also possible to retrieve from the document to filter, elements only partially satisfying the expression to process.

According to this feature, a pertinence measurement is associated with the extracted elements in this way making it possible, for example to classify the nodes according to their pertinence measurement.

According to a particular embodiment, the pertinence measurement is a function of the percentage of predicates satisfied with respect to the total number of predicates in the expression.

According to a particular embodiment, the method comprises a step of determining the data extracted from the document verifying the set of the sub-expressions.

In a complementary manner, the invention also concerns a device for filtering elements of a structured document on the basis of an expression, characterized in that, the expression comprising an item of information for identification of the evaluation mode of a part at least of said expression, the device comprises means for evaluating said expression on the basis of the data of the document, the evaluating means being adapted to evaluate said part of the expression on the basis of the item of information for identification of the evaluation mode.

This device has the same advantages as the method of filtering elements of a structured document on the basis of an expression, briefly described above, and they will therefore not be reviewed here.

According to other aspects, the invention also concerns computer programs for an implementation of the method of the invention described briefly above.

BRIEF DESCRIPTION OF THE DRAWINGS

Other aspects and advantages of the present invention will appear more clearly on reading the following description given solely by way of non-limiting example and made with reference to the accompanying drawings in which:

FIG. 1 represents an example of an XML document on which an expression is evaluated;

FIG. 9 illustrates the status for each evaluation mode, depending on the predicates and the position of the location step and on the type of expression in accordance with the invention;

DETAILED DESCRIPTION

The invention consists of filtering nodes of a document, for example an electronic document written in a markup language, in particular the XML language, the filtering being specified by means of an expression, in particular an XPath expression.

Filtering on the fly makes it possible to limit the quantity of XML data stored in a memory, in particular in a random access memory and to provide to the application a means for obtaining results progressively with their obtainment.

For this, an XPath processor interprets special characters inserted in XPath expressions. Depending on the presence or absence of these special characters, the XPath processor is configured in an evaluation mode.

The three permitted extraction modes in accordance with the invention, also termed filtering operations, are the following: the extraction of the nodes satisfying the expression, termed "mode match", the extraction of the nodes not satisfying the expression, termed "mode non-match", and the extraction of the nodes satisfying and the nodes not satisfying the expression, termed "mode match/non-match".

Figure 2:
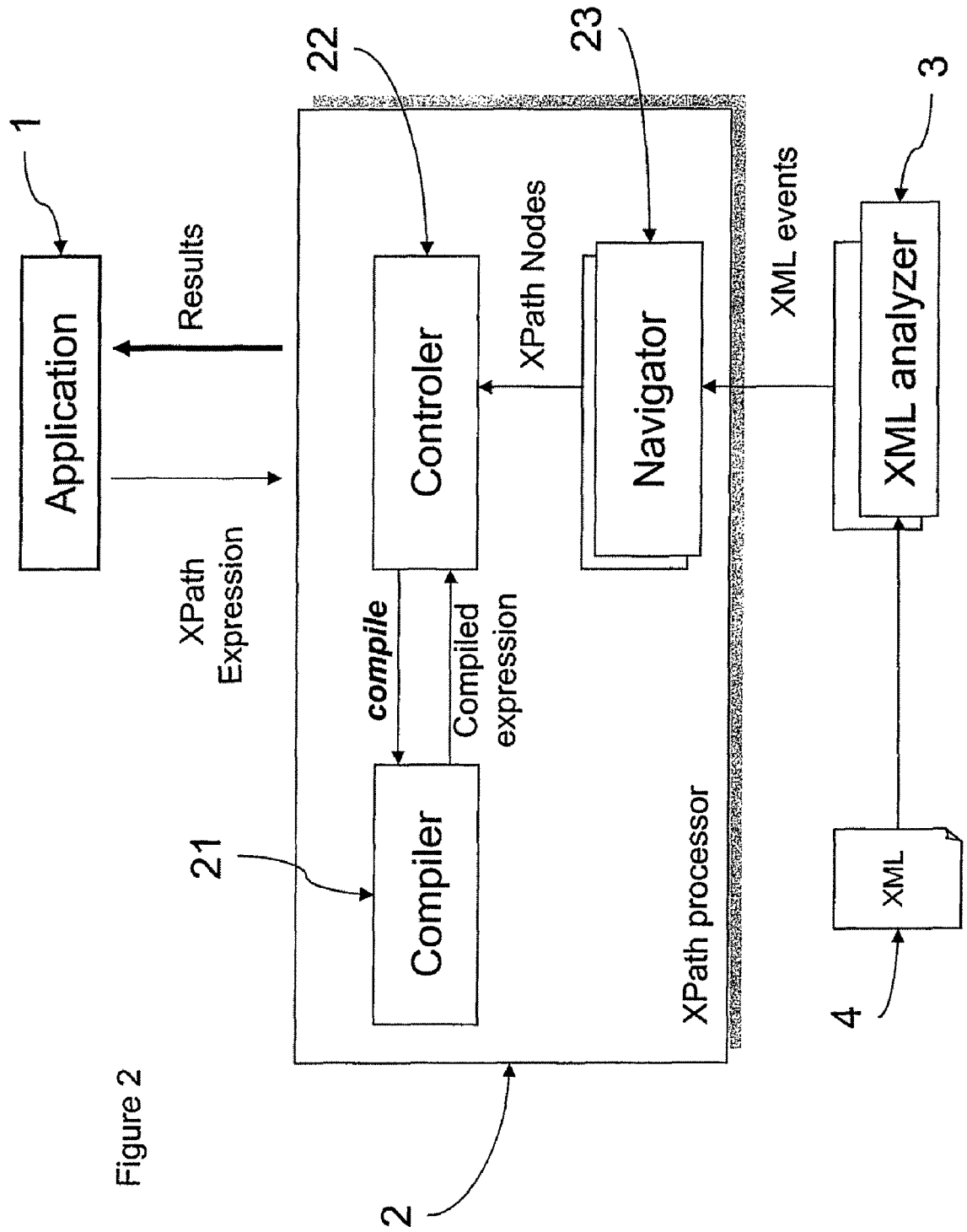
FIG. 2 illustrates the application context of the invention.

FIG. 2 illustrates the application context of the invention in which an application 1 processes XML data extracted by an XPath processor 2 by means of one or more XML analyzers 3 from an XML data stream 4, it being possible for an XML analyzer to be an XML browser.

According to one embodiment, the XPath processor 2 comprises three entities.

Firstly, it comprises a compiler 21 the role of which is to analyze the expressions and to translate them into an internal representation. The operation of this compiler is described below with reference to FIG. 4.

Next, the XPath processor comprises an execution control unit 22 adapted to manage the interactions between the different modules of an XPath processor as well as to manage the communication of the XPath processor with the application 1. Furthermore, it deals with the evaluation of the nodes.

Furthermore, the XPath processor comprises one or more XPath navigators 23 which enable the execution control unit 22 to generically drive one or more XML analyzers 3. The XPath navigators 23 are also adapted to represent the XML events received from the XML analyzers in the form of XPath nodes. The XPath navigators 23 have a buffer memory intended if need be to store the XPath nodes. The XML analyzers are responsible for the extraction of XML information from the stream or from a document 4 and for the sending thereof to the XPath processor 2.

The evaluation of an XPath expression is in particular described below with reference to FIGS. 4 and 5, and comprises a phase of analysis for the purpose of the compilation implemented for example by the compiler 21 and a phase of evaluation for the purpose of the extraction of the nodes according to the chosen evaluation mode implemented for example by the execution control unit 22.

Thus, the invention is implemented in particular in the XPath processor or processors.

Figure 3:
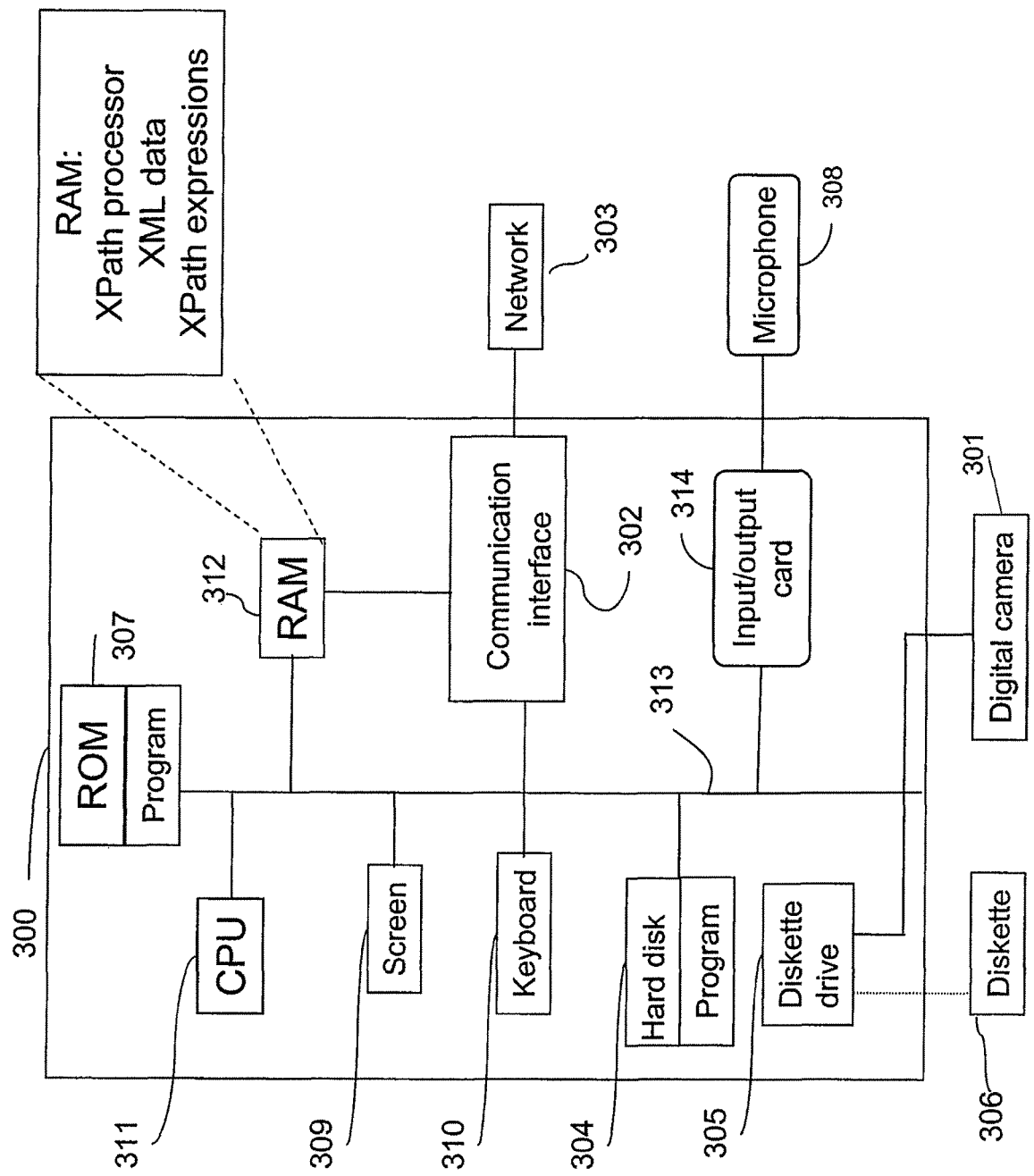
FIG. 3 is a diagrammatic representation of an apparatus in which the invention is implemented.

With reference to FIG. 3, a device adapted to operate as a device for filtering elements of a structured document on the basis of an expression, in particular an XPath expression will now be described in terms of its hardware configuration.

The device of FIG. 3 has all the means necessary for the implementation of the method of filtering elements of a structured document on the basis of an expression, in particular an XPath expression according to the invention.

According to the embodiment that is chosen, the device is for example a microcomputer 300 connected to different peripherals, for example a digital camera 301 (or a scanner, or any other image acquisition or storage means) connected to a graphics card.

The micro-computer 300 preferably comprises a communication interface 302 connected to a network 303 adapted to transmit digital information. The micro-computer 300 also comprises a storage means 304, such as a hard disk, as well as a diskette drive 305.

The diskette 306 as well as the disk 304 can contain XML data according to the invention as well as the code of the invention which, once read by the micro-computer 300, will be stored on the hard disk 304.

According to a variant, the program or programs enabling device 300 to implement the invention are stored in a read only memory ROM 307.

According to another variant, the program or programs are partly or wholly received via the communication network 303 in order to be stored as stated.

The micro-computer 300 may also be connected to a microphone 308 through an input/output card 314. The micro-computer 300 also comprises a screen 309 in particular to enable the user to view the results of the evaluations. Using the keyboard 310 or any other appropriate means, the user may specify an XPath expression.

The central processing unit CPU 311 executes the instructions relating to the implementation of the invention, which are stored in the read only memory ROM 307 or in the other storage means described.

On powering up, the programs and methods for filtering elements of a structured document on the basis of an expression, in particular an XPath expression, stored in one of the non-volatile memories, for example the ROM 307, are transferred into the random access memory RAM 312, which will then contain the executable code of the invention as well as the variables necessary for implementing the invention.

As a variant, the methods may be stored in different storage locations of the device 300. Generally, an information storage means, which can be read by a computer or microprocessor, integrated or not into the device, and which may possibly be removable, stores a program of which the execution implements the method of filtering elements of a structured document on the basis of an expression. It is also possible to upgrade the embodiment of the invention, for example, by adding filtering methods brought up to date or improved that are transmitted by the communication network 303 or loaded via one or more diskettes 306. Naturally, the diskettes 306 may be replaced by any form of information carrier such as CD-ROM, or memory card.

A communication bus 313 enables communication between the different elements of the micro-computer 300 and the elements connected thereto. It will be noted that the representation of the bus 313 is non-limiting. Thus the central processing unit CPU 311 may, for example, communicate instructions to any element of the micro-computer 300, directly or via another element of the micro-computer 300.

Figure 4:
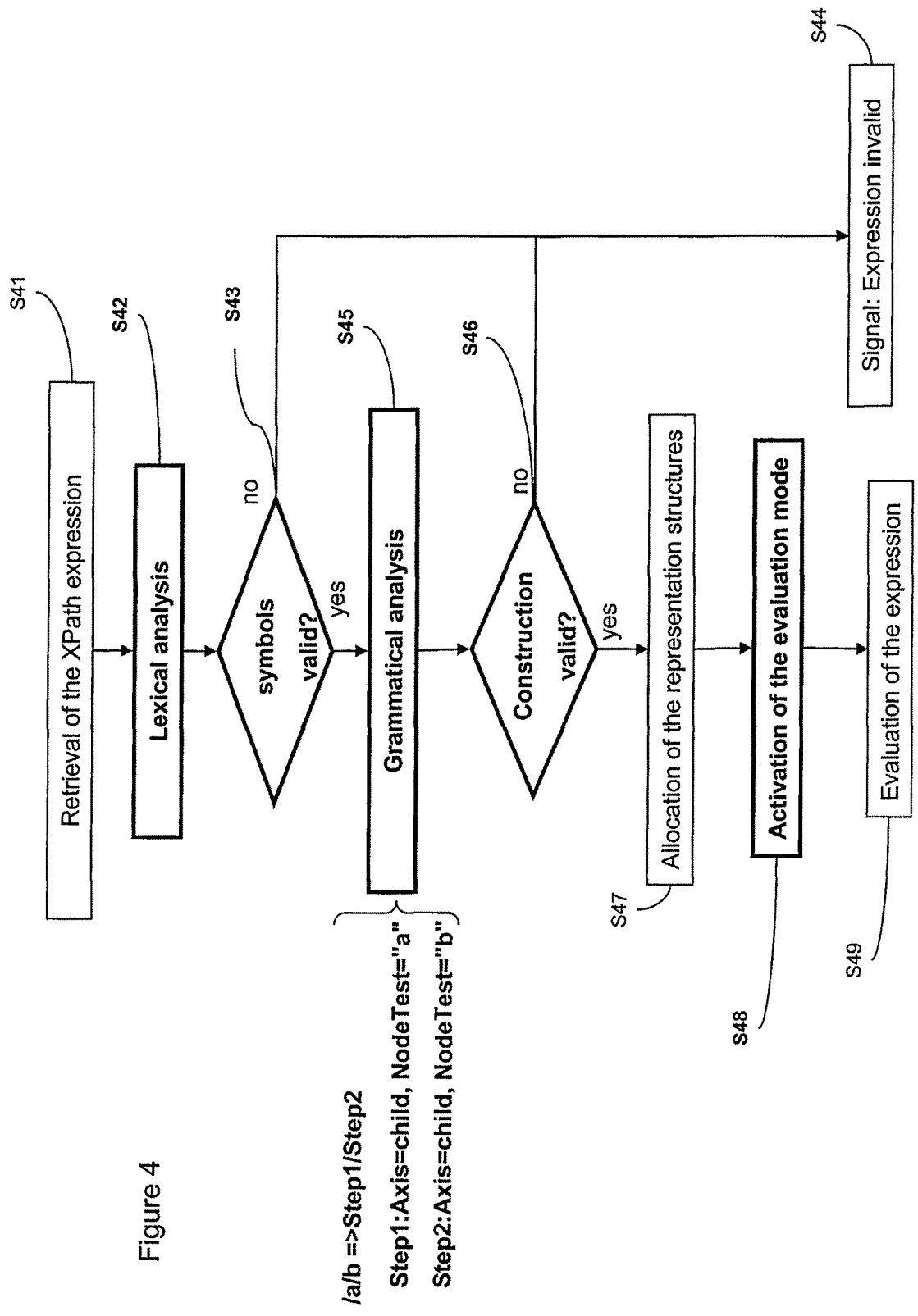
FIG. 4 illustrates an algorithm for compiling an XPath expression in accordance with the invention.

FIG. 4 illustrates an algorithm for compiling an XPath expression implemented in the compiler of an XPath processor in accordance with the invention.

The XPath expression to evaluate may be specified by a user or else stored for example in a file and read by the application 1.

According to another embodiment, the XPath expression results from the execution by the application of a program generating XPath expressions.

The expression is received by the XPath processor 2 at step E41.

Step S42, which follows step S41 consists of commencing the lexical analysis of the expression. For this and according to one embodiment, the characters of the XPath expression are analyzed one by one in order, next, to group together the characters and form symbols, also known as "tokens".

The grouping together of the characters makes it possible in particular to determine the reserved symbols defined in the XPath specification, for example the character "/" or classes of characters representing for example numbers or simple characters.

Furthermore, the grouping together makes it possible to determine the specific signaling characters of the evaluation mode.

According to one embodiment, the specific character "?" defines the "non-match" evaluation mode and the specific character "??" the "match/non-match" evaluation mode.

However, it is to be noted that any particular character not reserved for the XPath normative syntax may be used to carry out that signaling.

Step S42 is followed by step S43 during which symbols generated by the lexical analyzer during step S42 are tested, the generated symbols comprising in particular the specific characters.

Thus, in accordance with the invention, at step S43, the lexical analyzer identifies the predefined symbols making it possible to signal the evaluation mode, i.e. the specific characters "?" and "??".

If during this step, one of the symbols is analyzed as being not permitted or unknown, the step S43 is followed by step S44 during which the compiler terminates its execution and informs the XPath processor 2 of the non-conformity of the expression. It will thus not be possible for the expression to be evaluated.

According to a variant embodiment, the unrecognized symbol is not considered and the compilation continues.

If at step S43, no invalid, unauthorized or unknown symbol is detected, step S43 is followed by step S45 during which the step of grammatical analysis is executed.

This steps consists, for the compiler 21, of going through the list of symbols determined at step S42 and of identifying the types of expression defined by the XPath 1.0 syntax in the expression to compile, the modified grammar of XPath 1.0 being described in Appendix A.

For example, if the first symbol found corresponds to "/", the expression is relative to an absolute LocationPath ("AbsoluteLocationPath" according to the XPath syntax) within the meaning of the XPath grammar. In this case, the compiler 21 continues the analysis of the symbols for identifying the components of that path, that is to say the location steps, which may be composed of entities expressing a filiation relationship ("AxisSpecifier" in the XPath syntax), a test of eligibility ("NodeTest" in the XPath syntax) and possibly one or more predicates. During this same step S45, as soon as the compiler identifies a location expression, it initializes an XPath navigator 23 which will take on the task of searching for candidate notes at the resolution of that expression. This processing is described below with reference to FIGS. 6 and 7.

Step S45 is followed by step S46 during which it is verified that the expression, that is to say the series of symbols, is valid according to the XPath grammar.

In the negative, the compilation of the expression is made to terminate and a signal: "expression invalid" is sent during step S44.

On the contrary, if the expression is valid, the algorithm continues at the step S47 during which the compiler 21 allocates in memory a structure for representing each component of the expression, in particular a structure by type of XPath sub-expression.

This step is followed by the step S48 which, for each location step extracted by the compiler 21, consists of configuring the associated evaluation mode. This step will be described in more detail below with reference to FIG. 5.

During this step, for each of each location step of each expression relative to a LocationPath, determination is made of the evaluation mode which must be implemented by the execution control unit 22 on evaluation of that location step.

At the end of this analysis, the compiler 21 informs the execution control unit 22 of the end of the analysis, the latter will then commence the evaluation of the expression (step S49).

The step S48 of FIG. 4 determines, for each location step of each expression relative to a LocationPath of an XPath expression, the evaluation mode of the XPath processor 2. Each location step is represented by a structure which contains at least one link to the LocationPath from which it comes (positioned during step S45), a link to the preceding location step of that LocationPath (positioned during step S45), a link to the next location step of that LocationPath (positioned during step S45) and a link to a list of predicates to verify (positioned during step S45), an evaluation status (positioned during the evaluation S49), an evaluation mode (which is the subject of step S48), and, possibly, a pertinence coefficient.

The analysis of the location steps will now be described with reference to FIG. 5.

This analysis thus applies to all the LocationPaths identified at step S45 as composing the XPath expression to evaluate.

According to one embodiment, this analysis is integrated into compilation step S45. In this embodiment, step S45 also comprises the steps S46 to S48 at the time of grammatical analyses.

According to another embodiment, step S48 appears as one of the steps consecutive to the step S45.

The analysis of the location steps coming from the compilation commences with the step S500 consisting of obtaining the structure constructed by the compiler at step S47 of FIG. 4 representing the expression relative to a LocationPath of which the location steps will be analyzed.

This structure comprises a list of the location steps which compose the expression relative to a LocationPath.

If the XPath expression does not comprise the LocationPath, step S500 and by incidence step S48 are terminated and the evaluation mode is, by default, the "match" mode.

If a LocationPath is present in the XPath expression, the algorithm continues at the step S501 during which it is verified whether the expression relative to the LocationPath commences with a signaling symbol or not.

If a signaling symbol is present, step S501 is followed by step S502 during which the value of the symbol is kept in the structure representing the LocationPath constructed at step S46.

In the opposite case, that is to say if the path does not commence with a signaling symbol, the algorithm continues at the step S503 during which the default value of the evaluation mode ("match") is kept in the structure for representing the LocationPath.

The steps S502 and S503 are followed by the step S504 consisting or retrieving the first location step from the expression relative to the current LocationPath.

The algorithm continues at the step S505 consisting of verifying whether that location step contains at least one predicate.

If the location step comprises no predicate, step S506 follows step S505 during which the value of the evaluation mode of that expression is initialized to the value "match". The following step is the step S509 during which it is tested whether there remains a location step to process.

If during the test of step S505, it proves to be the case that the current location step contains at least one predicate, the following step (step S510) consists of verifying whether at least one of the predicates contains a signaling symbol.

If no predicate is marked, the algorithm continues at the step S508 during which the value of the evaluation mode of the current location step is initialized with the value saved at the step S502 or S503. Next, the algorithm continues at the step S500 during which it is tested whether there remains an expression relative to a LocationPath to process.

Table 1, illustrated below, shows the calculation of the evaluation mode of a location step with unmarked predicates, while considering the processing of the last location step "b".

TABLE 1

| Expression | Evaluation mode of the expression relative to a LocationPath. | Evaluation mode of a location step. |
|---|---|---|
| /a[c]/b[d] | "match" | "match" |
| /a[?c]/b[d] | "match" | "match" |
| ?/a[c]/b[d] | "non-match" | "non-match" |
| /a[??c]/b[d] | "match" | "match" |
| ??/a[c]/b[d] | "match/non-match" | "match/non-match" |

During the step S510, if the current location step contains at least one marked predicate, the algorithm continues at the step S511 making it possible to determine the value of the evaluation mode to perform.

If at least one of the predicates contains a signaling symbol with the value of the evaluation mode "match/non-match", that value is kept as the value of the evaluation mode of the current location step.

In the opposite case, the "non-match" mode is activated.

Step S511 is followed by step S509 consisting of testing whether there remains at least one location step to process.

Table 2, illustrated below, shows the calculation of the evaluation mode of a location step with marked predicates, while considering the processing of the last location step "b".

TABLE 2

| Expression | Evaluation mode of the LocationPath | Evaluation mode of the Step b |
|---|---|---|
| /a[c]/b[??d] | "match" | "match/non-match" |
| /a[c]/b[?d] | "match" | "non-match" |
| ?/a[c]/b[?d] | "match" | "non-match" |
| /a[c]/b[d][?e] | "match" | "non-match" |
| /a[??c]/b[?d] | "match" | "non-match" |
| ??/a[c]/b[??d] | "match/non-match" | "match/non-match" |

This algorithm is reiterated until the last LocationPath of the expression, that is to say until the test of step 500 is negative.

Figure 5:
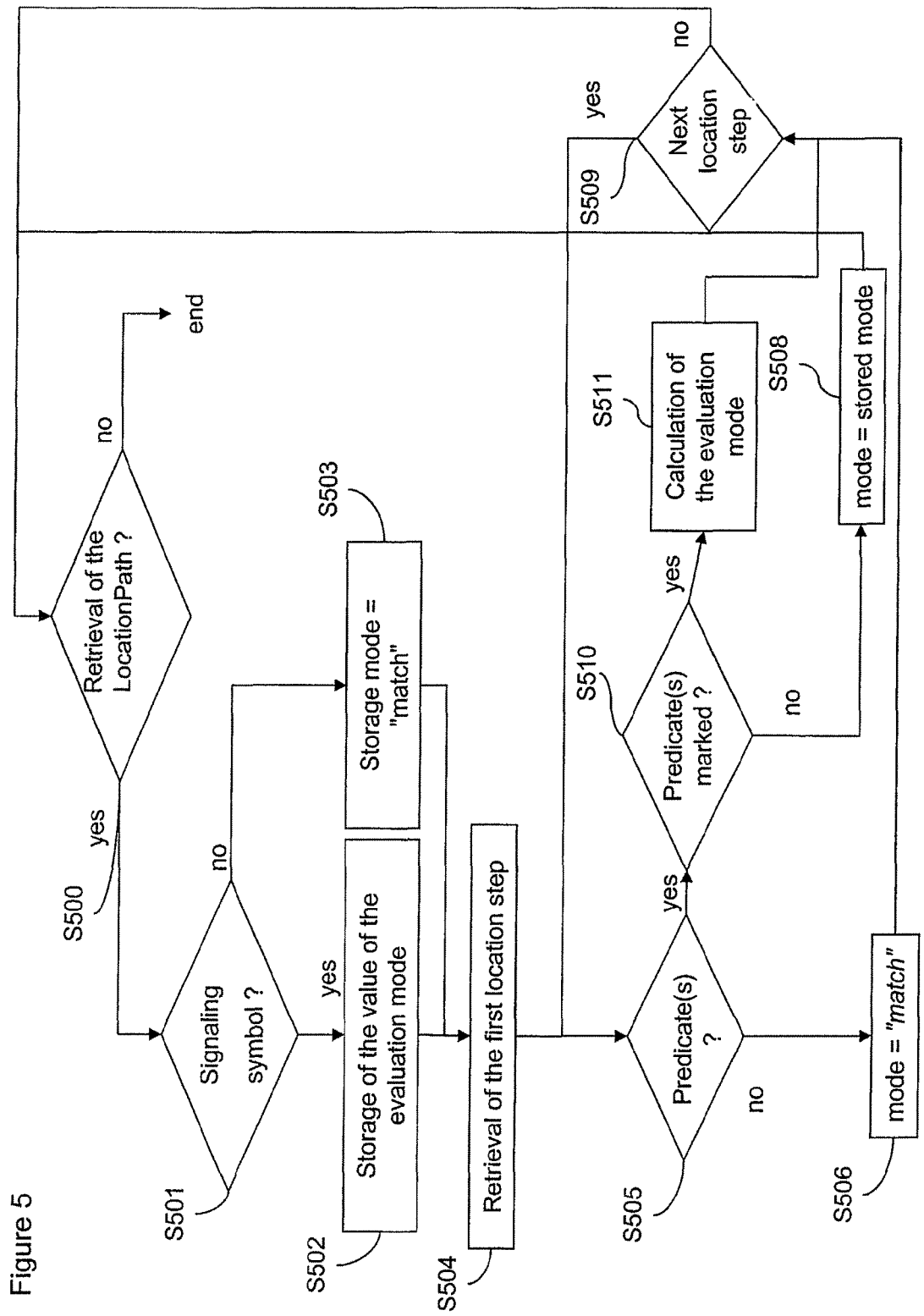
FIG. 5 illustrates an algorithm for analyzing filiation expressions in accordance with the invention.

Thus, the algorithm of FIG. 5 terminates as well as the step S48 of FIG. 4.

The following step S49 of FIG. 4 corresponds to the evaluation of the expression and is described below, with reference to FIG. 6.

The evaluation of an XPath expression in accordance with the invention is therefore now described with reference to FIG. 6.

The evaluation of an XPath expression is carried out on the basis of the structure generated by the compiler in particular as described with reference to FIG. 5.

With each type of expression of the XPath syntax there is associated a representation structure with references to the sub-expression or sub-expressions which compose it.

Furthermore, with each structure there is associated a list of instructions to execute for its evaluation. This list in particular comprises a call for the execution of the sub-expression or sub-expressions and of the instructions for managing the errors and/or the results. For example, for an expression of addition type ("AdditiveExpr" according to the XPath syntax), the list of instructions would be: evaluate the left operand, evaluate the right operand then apply the operator "+" to these 2 operands.

The algorithm for evaluation of an XPath expression commences with the step S600, consisting of initializing an execution control unit 22.

This step consists of resetting to zero all the information linked to the earlier evaluations as well as the results, the XML events still in memory in the XPath navigator 23, the intermediate states of evaluations of the expressions relative to LocationPaths or location steps.

Step S601, following on from step S600, consists of initializing the different expressions relative to an absolute LocationPath ("AbsoluteLocationPath" in the XPath syntax) which compose the XPath expression to evaluate.

For this, for each expression relative to an AbsoluteLocationPath, a buffer memory is reserved intended to receive intermediate evaluation results.

If this memory has already been reserved, in particular during a prior evaluation of that same expression, the data contained in that memory are reset to zero during that same step.

Step S601 is followed by step S602 consisting of preparing, on the basis of each expression relative to an AbsoluteLocationPath contained in the XPath expression, a list of location steps to evaluate, the evaluation and the going through of the XML document being based in particular on the break down into location steps.

Thus, during this step S602, the location steps are classified according to the values of the entities expressing a filiation relationship ("AxisSpecifier" according to the XPath syntax) of those steps.

According to one embodiment, during that step S602, the location steps are classified on the basis of the depth at which to search for a candidate node.

For example, an attribute ("attribute" according to the XPath specification) and a "context node" ("self" according to the XPath specification) take priority with respect to a child ("child" according to the XPath specification) and with respect to a following one ("following" according to the XPath specification).

More particularly, the former ones designate a candidate XML node located at the current depth whereas the latter ones respectively necessitate exploring possible elements having a depth incremented by 1 with respect to the current node and to consider the nodes located beyond the end of the current element.

Furthermore, the location steps may be provisionally stored in the memory of the execution control unit 22.

Step S602 is followed by step S603 consisting of going through the XML document 4 by means of the XML analyzer 3 in search of the next XML node.

Next, the extracted node is returned to the XPath navigator 23, to be stored in its list of nodes.

The following step (step S604) verifies whether the node received may be considered as a candidate for the resolution of one or more of the location steps present in the list constructed at step S602.

If the node corresponds to an attribute, an XML element, a text node or a comment node, that node is considered as a candidate node. The algorithm then continues at the step S608 described below.

If that is not the case, the algorithm continues at the step S605 consisting of testing whether the node obtained corresponds to an XML element end.

In the positive case, step S605 is followed by step S606 during which the algorithm returns to the previous list of the location steps.

Step S606 is followed by step S607 consisting of testing whether the list is empty or not. In this way, it is tested whether a return has been made beyond the first step of the expressions relative to the path considered.

If the list is empty, the end of the evaluation is detected. In the opposite case, the algorithm continues at step S602 described earlier.

If, at step S605, the node retrieved does not corresponds to an XML element end, the node is ignored and the algorithm continues at the step S603 consisting of going through the XML document.

Returning to step S604, if the extracted node is a candidate node, the algorithm continues at the step S608 consisting of obtaining an entity expressing an eligibility test of a candidate node ("NodeTest" according to the XPath syntax).

Next, the algorithm continues at the step S609 consisting of testing that node with respect to the eligibility test of the current location step.

The application of each eligibility test at step S609 consists of verifying either the name, or the type of candidate node with respect to the values imposed by the eligibility test of the location step.

Thus if the eligibility test is satisfied at step S609, the algorithm continues at the step S610 during which the current location step has its evaluation status set to the value "potentially resolved".

In the opposite case, the algorithm continues at the step S611 during which the current location step is marked as "not resolved".

Next, step S611 is followed by the step S612 consisting of testing whether a location step remains to process.

If that is the case, the following location step is proceeded to and the algorithm continues at the step S608 already described until the end of the list, that is to say until the test of step S612 is negative.

Returning to step S610, this step is followed by the step S613 consisting of verifying whether the location step contains at least one predicate.

If that is the case, step S613 is followed by step S614 consisting of verifying one or more predicates contained in the location step.

This step is described with reference to FIG. 7.

At the end of step S614, the evaluation status of the current step may have the following values:

Firstly, the status may be "Resolved with intermediate solution" in the case of an intermediate location step for which a solution node has been found.

Next, the status may be "Resolved with final result" in the case of a last location step of an expression relative to a LocationPath composing the principal expression. This may, for example, be the expression /bookstore/book/title. More particularly, if the principal expression contains an expression of LocationPath type, the expected result is a list of nodes. The result given by any expression of LocationPath type situated in the predicates, in particular on each side of a comparison operator or in function calls, is either a Boolean, or a list of nodes intended to be converted into another type, in particular that produced by the function. Thus, the invention applies to the principal expressions yielding a list of nodes.

Furthermore, the status may be "Resolved with partial result" in the case of a last location step arising from an expression relative to a LocationPath composing a sub-expression of the principal expression. This may be, for example, the expression /bookstore/book/title="Learning XML", the principal expression here being an expression of equality ("EqualityExpr" in XPath syntax). According to the example considered, the nodes resulting from the expression are intermediate results on which the equality operator is applied. More particularly, the expected result for the evaluation of the expression of the example is a Boolean and not one or more nodes.

Furthermore, the status may be "Resolved without solution", whatever the type of location step for which no node satisfies the constraints.

The step S614 is followed by step S612 making it possible to pass on to the following location step in the list calculated at step S602.

If a following location step exists, the algorithm continues starting from the step S608 already described.

Otherwise, the algorithm continues at the step S615 consisting of preparing the following list.

Step S615 is followed by step S616 during which it is tested whether the following list is empty or not.

If the list is empty, the algorithm continues at step S617.

This means that the last steps of locating expressions relative to current LocationPaths, prepared during step S601, have been attained.

During this step, the algorithm yields results. The execution control unit 22 retrieves the node or nodes, from memory of the XPath navigator 23, that satisfied the last location step or steps of each expression relative to a LocationPath, transmits them to the application if the expected result is of node list type or else applies to them a function or a test according to the type of expression to evaluate.

During this sending and in the case of a "match/non-match" evaluation mode, the status of the node, stored in memory in the structure representing an XPath node, is also provided to the application.

Step S617 is followed by step S606 in order to climb the list of previous location steps, as already described, in order to search for new candidate nodes for the resolution of the expressions relative to LocationPaths if that list is not empty (test of step S607).

If the test of step S616 indicates that a list of location steps is not empty, the algorithm continues at the step S602 already described in order to evaluate those location steps.

Returning to step S613, if the test is negative, that is to say if the location step does not contain any predicate, the algorithm continues at the step S618 consisting of updating the evaluation status of the current location step.

If it is an intermediate location step, its evaluation status takes the value: "resolved with intermediate solution".

If it is the last location step of an expression relative to a LocationPath corresponding to the principal expression, it is marked as "resolved with final result".

If it is a location step arising from an expression relative to a LocationPath corresponding to a sub-expression of the expression to evaluate, its evaluation status takes the value: "Resolved with partial result".

The step S618 is followed by the step S612 already described, consisting of testing whether a location step remains to process.

Figure 7:
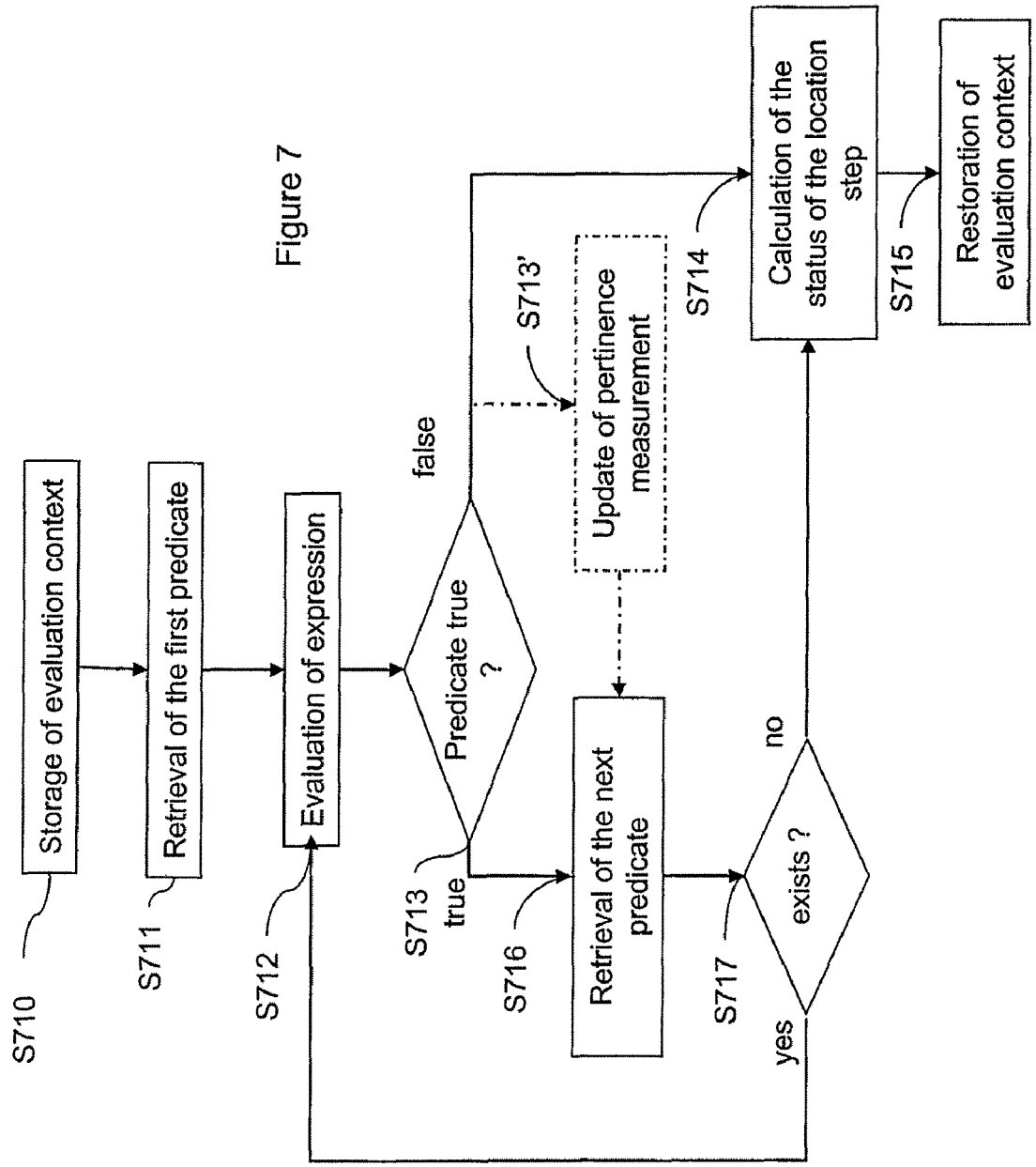
FIG. 7 illustrates an algorithm for verifying possible predicates contained in the location step comprising the different operations of the step S614 of FIG. 6 according to the invention.

FIG. 7 illustrates an algorithm for verifying predicates that may be contained in the location step, this algorithm illustrating the different operations carried out at the step S614.

This predicate verification algorithm commences at step 710 by saving the evaluation context of the execution control unit 22. For this, the following information is stored in a memory of the execution control unit 22: the list of the current location steps, the location step on which the predicate or predicates are verified, termed context location step, and the context node situated in memory of the XPath navigator 23.

After having stored in memory the evaluation context, step S710 is followed by step S711 during which the evaluation of the first predicate commences. For this, the first predicate of the list is obtained.

According to one embodiment, a link on the list of predicates contained in the location step makes it possible to obtain the first predicate.

This first predicate becomes the current predicate.

The following step (step S712) consists of evaluating the XPath sub-expression representing the current predicate.

Figure 6:
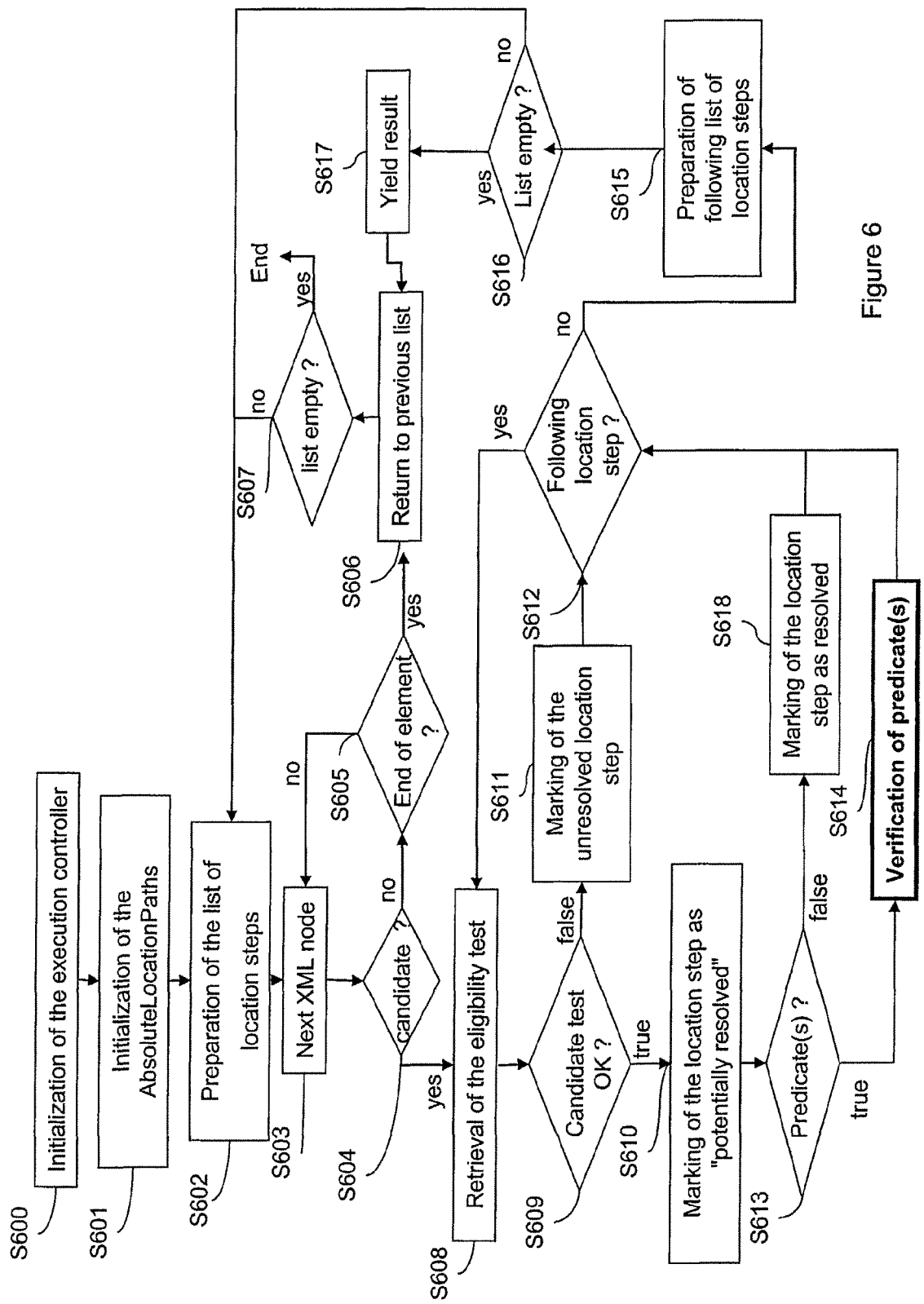
FIG. 6 represents an algorithm for evaluating an XPath expression according to the invention.

The evaluation of the predicate corresponds to the evaluation of an expression in accordance with the algorithm of FIG. 6 already described.

However, a specificity is the fact that the nodes resulting from an expression representing a predicate are not transmitted to the application but translated into a "true" or "false" Boolean result according to the test to be carried out in the predicate, for example a test of value, a test of position, a test of name or test of mere existence.

Thus, step S712 produces a Boolean result. This step is followed by the step S713 consisting testing the value of the result.

If the result has the value false, the following step (step S714) consists of calculating the evaluation status of the location step.

This step is described later on with reference to FIG. 8.

Step S714 is followed by step S715 during which the evaluation context corresponding to the context location step is restored. This context is reestablished from information stored in the memory of the execution control unit 22.

If, during the test of step S713, the result takes the value true, the algorithm continues at the step S716 during which the next predicate to verify is obtained from the list of predicates of the current location step.

Step S716 is followed by step S717 during which it is tested whether a new predicate has been found.

If that is the case, the algorithm continues at previously described step S712 in order to evaluate the associated expression. Next, the steps S713 to 717 are reiterated.

This iteration takes place as long as the current predicate has the value "true" (step S713) and the test of step S717 is positive.

If the test of step S717 is negative, that is to say if there is no longer any predicate, the algorithm continues at the step S714 already described consisting of calculating the evaluation status of the current location step, and then of restoring the evaluation context at step S715.

Figure 8:
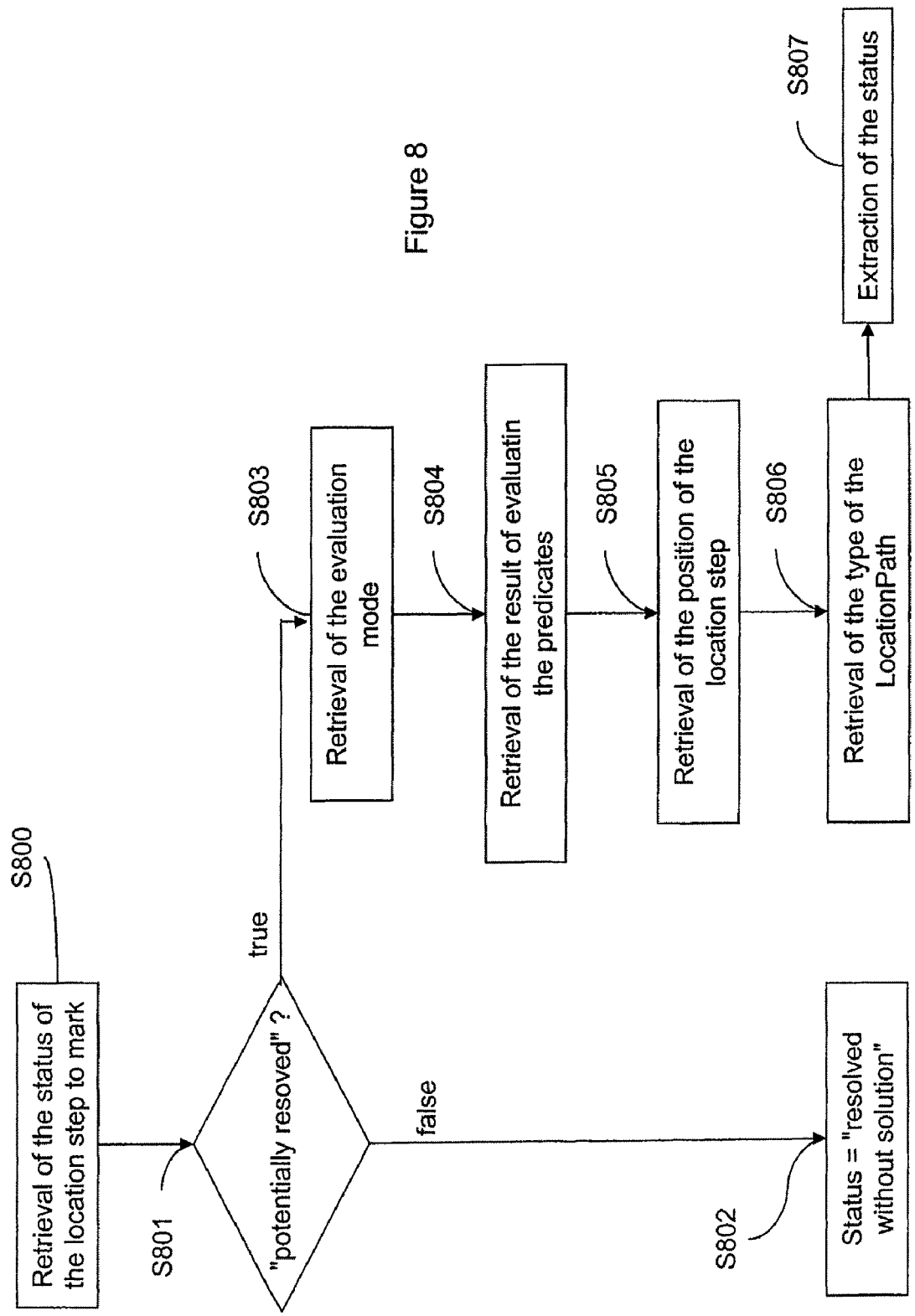
FIG. 8 illustrates an algorithm for calculating evaluation status of a location step in accordance with the invention.

FIG. 8 illustrates an algorithm for calculating the evaluation status of a location step in accordance with the invention.

The evaluation status of a location step is calculated according to the steps of FIG. 8.

For this, the data considered are, the position of the location step in the expression relative to a LocationPath from which it comes, the nature of that LocationPath, for example principal expression or sub-expression, the evaluation mode of the location step, the initial evaluation status of the location step and the result of the evaluation of the predicate or predicates associated with the location step.

The algorithm commences at step S800 consisting of obtaining the initial value of the evaluation status of the current location step.

Step S800 is followed by step S801 during which the value obtained is tested relative to the value "potentially resolved".

If the value obtained is different from the value "potentially resolved", the algorithm continues at the step S802 during which the evaluation status of the location step takes the value "resolved without solution".

In the opposite case, that is to say if the value obtained is "potentially resolved", the evaluation status depends both on the evaluation mode of the location step and on the result of evaluating its predicate or predicates.

Thus, the algorithm continues at the step S803 during which the value of the evaluation status of the current location step is obtained, i.e. the value "match", or the value "non-match" or the value "match/non-match".

The step S804 following the step S803 consists of obtaining the result of the verification of the predicate or predicates associated with the location step, that is to say the value true or the value false.

Next, the following step (step S805) makes it possible to obtain the position of the location step in the expression relative to the LocationPath. The information obtained is a Boolean indicating that it is an intermediate location step or the last location step.

Lastly, the step S805 is followed by the step S806 during which the type of the expression relative to the LocationPath is obtained and it is determined whether it is a principal expression or a sub-expression.

During the following step (step S807), these data are used as input data in the look-up table illustrated in FIG. 9 in order to extract the evaluation status.

FIG. 9 illustrates the status for each evaluation mode, depending on the predicates and the position of the location step and on the type of expression.

According to one embodiment, the implementation of the invention also makes it possible to classify the nodes of an XML document according to a degree of pertinence relative to a given XPath expression.

According to this embodiment, a marker indicating the "match" or "non match" character is no longer joined to the detected nodes having the "match/non-match" mode, but a pertinence measurement is associated with the result nodes that is determined as a function of the percentage of satisfied predicates with respect to the total number of predicates of the expression.

For example, if the following expression is considered applied to the XML document illustrated in FIG. 1 and presented earlier ??//book[@price<20][title/@lang="French"], then the elements "book" below may be yielded, after application of the data of Table 3 for the calculation of the degree of pertinence of a result.

TABLE 3

| Predicate 1 | Predicate 2 | Total | Pertinence (%) |
|---|---|---|---|
| 0 | 0 | 0 | 0 |
| 0 | 1 | 1 | 33 |
| 1 | 0 | 2 | 66 |
| 1 | 1 | 3 | 100 |

A first result having a pertinence measurement of 66% is the following element:

```
<book price="17.99">
    <title lang="English">Harry Potter and the Half Blood Prince</title>
    <author>JK Rowling</author>
</book>
```

A second result having a pertinence measurement of 100% is the following element:

```
<book price="16.47">
    <title lang="French">Les Misérables</title>
    <author>V Hugo</author>
</book>
```

A third result having a pertinence measurement of 0% is the following element:

```
<book price="26.37">
    <title lang="English">Learning XML</title>
    <author>E T Ray</author>
</book>
```

A fourth result having a pertinence measurement of 66% is the following element:

```
<book price="13.57">
    <title lang="German">Selected Poems</title>
    <author>Goethe</author>
</book>
```

On sending the result, the degree of pertinence may be either requested from the XPath processor by the application on reception of the result node, or integrated as first attribute or first element of each XML node.

In order to enable this kind of application, each expression relative to a LocationPath composing a principal expression must keep a word of n bits, n being the number of predicates composing the expression relative to a LocationPath.

During the resolution of each location step, when the evaluation mode has the value "match/non-match", the word is updated as described above.

For a given location step, the latter possesses a predicate index going from 0 to n. If it is considered that the predicate having the symbol "i" is in course of verification at step S614 of FIG. 6, the i-th binary element of the word of n binary elements is then updated with the value resulting from the evaluation of that predicate i.

However, according to this embodiment, it is necessary to process all the predicates of a location step even if one of them is evaluated as false. This may be carried out at a step S713' inserted between the steps S713 and S714 in FIG. 7.

Thus, as illustrated in Table 4 below for calculating the degree of pertinence, the pertinence value is available at the same time as the result node.

TABLE 4

| Predicate 1 | ... | Predicate n | Total | Pertinence (%) |
|---|---|---|---|---|
| 0 | 0 | 0 | 0 | 0 |
| 0 | 0 | 1 | 1 | $100/(2^n-1)$ |
| ... | ... | ... | ... | ... |
| 1 | 1 | 0 | $2^n-2$ | $100(2^n-2)/(2^n-1)$ |
| 1 | 1 | 1 | $2^n-1$ | 100 |

APPENDIX A

| [14] | Expr | ::= | OrExpr |
| [21] | OrExpr | ::= | AndExpr \| <br> OrExpr 'or' AndExpr |
| [22] | AndExpr | ::= | EqualityExpr \| <br> AndExpr 'and' EqualityExpr <br> RelationalExpr \| |
| [23] | EqualityExpr | ::= | EqualityExpr '=' RelationalExpr \| <br> EqualityExpr '!=' RelationalExpr <br> AdditiveExpr \| |
| [24] | RelationalExpr | ::= | RelationalExpr '<' AdditiveExpr \| <br> RelationalExpr '>' AdditiveExpr \| <br> RelationalExpr '<=' AdditiveExpr \| <br> RelationalExpr '>=' AdditiveExpr |
| [25] | AdditiveExpr | ::= | MultiplicativeExpr \| <br> AdditiveExpr '+' MultiplicativeExpr \| <br> AdditiveExpr '−' MultiplicativeExpr <br> UnaryExpr \| |
| [26] | MultiplicativeExpr | ::= | MultiplicativeExpr MultiplyOperator UnaryExpr \| <br> MultiplicativeExpr 'div' UnaryExpr \| <br> MultiplicativeExpr 'mod' UnaryExpr |
| [27] | UnaryExpr | ::= | UnionExpr \| '−' UnaryExpr |
| [18] | UnionExpr | ::= | PathExpr \| <br> UnionExpr '\|' PathExpr <br> LocationPath \| |
| [19] | PathExpr | ::= | FilterExpr \| <br> FilterExpr '/' RelativeLocationPath \| <br> FilterExpr '//' RelativeLocationPath |
| [20] | FilterExpr | ::= | PrimaryExpr \| FilterExpr Predicate <br> VariableReference \| <br> '(' Expr ')' \| |

APPENDIX A-continued

| [15] | PrimaryExpr | ::= | Literal \| Number \| FunctionCall RelativeLocationPath \| '?'RelativeLocationPath \| |
| [1] | LocationPath | ::= | '??'RelativeLocationPath \| AbsoluteLocationPath \| '?'AbsoluteLocationPath \| '??'AbsoluteLocationPath |
| [2] | AbsoluteLocationPath | ::= | '/' RelativeLocationPath? \| AbbreviatedAbsoluteLocationPath Step \| |
| [3] | RelativeLocationPath | ::= | RelativeLocationPath '/' Step \| AbbreviatedRelativeLocationPath |
| [10] | AbbreviatedAbsoluteLocationPath | ::= | '//'RelativeLocationPath |
| [11] | AbbreviatedRelativeLocationPath | ::= | RelativeLocationPath '//' Step |
| [4] | Step | ::= | AxisSpecifier Node Test Predicate* \| AbbreviatedStep |
| [12] | AbbreviatedStep | ::= | '.' \| '..' |
| [5] | AxisSpecifier | ::= | AxisName '::' \| |
| [13] | AbbreviatedAxisSpecifier | ::= | AbbreviatedAxisSpecifier '@'? NameTest \| |
| [7] | NodeTest | ::= | NodeType '(' ')' \| 'processing-instruction' '(' Literal ')' |
| [37] | NameTest | ::= | '*' \| NCName ':' '*' \| QName |
| [38] | NodeTest | ::= | 'comment' \| 'text' \| 'processing-instruction' \| 'node' '[' PredicateExpr ']' \| |
| [8] | Predicate | ::= | '[' ?PredicateExpr ']' \| '[' ??PredicateExpr ']' |
| [9] | PredicateExpr | ::= | Expr |
| [16] | FunctionCall | ::= | FunctionName '(' (Argument ( ',' Argument)* )? ')' |
| [17] | Argument | ::= | Expr |

The invention claimed is:

1. A method of filtering elements of a structured document on the basis of an expression including an item of information for identification of an evaluation mode of a part of said expression, comprising:
a step of evaluating, by a processor, said expression on the basis of the data of the structured document by evaluating said part of the expression on the basis of the item of information for identification of the evaluation mode, the evaluation mode corresponding to (i) an extraction of elements not satisfying said part of the expression, or (ii) an extraction of elements satisfying said part of the expression and an extraction of elements not satisfying said part of the expression, said part of the expression being evaluated on the basis of the data of the structured document according to at least two different evaluation modes;
wherein the expression includes at least one sub-expression relative to a LocationPath, and at least one sub-expression includes said part of the expression;
wherein each sub-expression relative to a LocationPath includes at least one location step, and at least one location step includes said part of the expression;
wherein the step of evaluating said expression includes a step of evaluating at least one location step;
wherein at least one location step includes at least one predicate, and the step of evaluating said at least one location step is based on the result of the evaluation of said at least one predicate associated with said at least one location step; and
wherein said information for identification of the evaluation mode of said at least one predicate identifies a mode of extraction of the elements satisfying said at least one predicate and elements not satisfying said at least one predicate, and the step of evaluating the location step extracts elements satisfying said at least one predicate and elements not satisfying said at least one predicate.

2. The filtering method according to claim 1, wherein the step of evaluating at least one location step is based on a position of said at least one location step in the sub-expression relative to the LocationPath.

3. The filtering method according to claim 1, wherein the step of evaluating at least one location step is based on the nature of the sub-expression relative to the LocationPath.

4. The filtering method according to claim 1, wherein said at least one predicate includes said part of the expression.

5. The filtering method according to claim 1, further comprising a step of associating an item of information with the extracted elements to indicate the satisfaction or non-satisfaction of the elements extracted from said part of the expression.

6. The filtering method according to claim 1, wherein the extracted elements are associated with a pertinence measurement.

7. The filtering method according to claim 6, wherein the pertinence measurement is based on a percentage of predicates satisfied with respect to the total number of predicates in the expression.

8. The filtering method according to claim 1, wherein said part of the expression includes a set of sub-expressions, and further comprising a step of determining the data extracted from the document verifying the set of the sub-expressions.

9. The filtering method according to claim 1, wherein the expression is an XPath type expression.

10. A device for filtering elements of a structured document on the basis of an expression including an item of information for identification of an evaluation mode of a part of said expression, the device comprising:
a memory for storing computer-executable process steps and a processor programmed to perform the process steps stored in the memory, such that the processor performs the steps of:

evaluating said expression on the basis of the data of the structured document, the evaluating by evaluating said part of the expression on the basis of the item of information for identification of the evaluation mode, the evaluation mode corresponding to (i) an extraction of elements not satisfying said part of the expression, or (ii) an extraction of elements satisfying said part of the expression and an extraction of elements not satisfying said part of the expression, said part of the expression being evaluated on the basis of the data of the structured document according to at least two different evaluation modes;

wherein the expression includes at least one sub-expression relative to a LocationPath, and at least one sub-expression includes said part of the expression;

wherein each sub-expression relative to a LocationPath includes at least one location step, and at least one location step includes said part of the expression;

wherein the step of evaluating said expression includes a step of evaluating at least one location step;

wherein at least one location step includes at least one predicate, and the step of evaluating said at least one location step is based on the result of the evaluation of said at least one predicate associated with said at least one location step; and wherein said information for identification of the evaluation mode of said at least one predicate identifies a mode of extraction of the elements satisfying said at least one predicate and elements not satisfying said at least one predicate, and the step of evaluating the location step extracts elements satisfying said at least one predicate and elements not satisfying said at least one predicate.

11. The filtering device according to claim 10, the processor further operable to perform associating an item of information with the extracted elements to indicate the satisfaction or non-satisfaction of the elements extracted from said part of the expression.

12. The filtering device according to claim 10, the processor further operable to perform associating a pertinence measurement with the extracted elements.

13. A non-transitory computer-readable storage medium for storing a computer program for filtering a structured document that can be loaded into a computer system, said program containing instructions executable by the processor for carrying out the step of evaluating said expression on the basis of the data of the document by evaluating said part of the expression on the basis of the item of information for identification of an evaluation mode, the evaluation mode corresponding to (i) an extraction of elements not satisfying said part of the expression, or (ii) an extraction of elements satisfying said part of the expression and an extraction of elements not satisfying said part of the expression, said part of the expression being evaluated on the basis of the data of the structured document according to at least two different evaluation modes;

wherein the expression includes at least one sub-expression relative to a LocationPath, and at least one sub-expression includes said part of the expression;

wherein each sub-expression relative to a LocationPath includes at least one location step, and at least one location step includes said part of the expression;

wherein the step of evaluating said expression includes a step of evaluating at least one location step;

wherein at least one location step includes at least one predicate, and the step of evaluating said at least one location step is based on the result of the evaluation of said at least one predicate associated with said at least one location step; and wherein said information for identification of the evaluation mode of said at least one predicate identifies a mode of extraction of the elements satisfying said at least one predicate and elements not satisfying said at least one predicate, and the step of evaluating the location step extracts elements satisfying said at least one predicate and elements not satisfying said at least one predicate.

14. A method of filtering elements of a structured document on the basis of an expression including an item of information for identification of an evaluation mode of a part of said expression, the expression including at least one sub-expression relative to a LocationPath, at least one sub-expression including said part of the expression, each sub-expression relative to a LocationPath including at least one location step, and at least one location step including said part of the expression, the method comprising:

a step of evaluating, by a processor, said expression on the basis of the data of the structured document by evaluating said part of the expression on the basis of the item of information for identification of the evaluation mode, the evaluation mode corresponding to (i) an extraction of elements not satisfying said part of the expression, (ii) an extraction of elements satisfying said part of the expression, or (iii) an extraction of elements satisfying said part of the expression and an extraction of elements not satisfying said part of the expression, the step of evaluating said expression including a step of evaluating at least one location step, wherein at least one location step includes at least one predicate, and the step of evaluating said at least one location step is based on the result of the evaluation of said at least one predicate associated with said at least one location step, wherein said information for identification of the evaluation mode of said at least one predicate identifies a mode of extraction of the elements satisfying said at least one predicate and elements not satisfying said at least one predicate, and the step of evaluating the location step extracts elements satisfying said at least one predicate and elements not satisfying said at least one predicate.

15. The filtering method according to claim 14, wherein the step of evaluating at least one location step is based on a position of said at least one location step in the sub-expression relative to the LocationPath.

16. The filtering method according to claim 14, wherein the step of evaluating at least one location step is based on the nature of the sub-expression relative to the LocationPath.

17. The filtering method according to claim 14, wherein said at least one predicate includes said part of the expression.

18. The filtering method according to claim 14, further comprising a step of associating an item of information with the extracted elements to indicate the satisfaction or non-satisfaction of the elements extracted from said part of the expression.

19. The filtering method according to claim 14, wherein the extracted elements are associated with a pertinence measurement.

20. The filtering method according to claim 19, wherein the pertinence measurement is based on a percentage of predicates satisfied with respect to the total number of predicates in the expression.

21. The filtering method according to claim 14, wherein said part of the expression includes a set of sub-expressions, and further comprising a step of determining the data extracted from the document verifying the set of the sub-expressions.

22. The filtering method according to claim 14, wherein the expression is an XPath type expression.

* * * * *